US010862748B1

(12) United States Patent
Deruijter

(10) Patent No.: US 10,862,748 B1
(45) Date of Patent: Dec. 8, 2020

(54) INTENT DRIVEN CONTROLLER FOR PROVISIONING SOFTWARE APPLICATIONS ON NETWORKED EQUIPMENT

(71) Applicant: Denis Deruijter, Harvard, MA (US)

(72) Inventor: Denis Deruijter, Harvard, MA (US)

(73) Assignee: OPTUMI, Inc., Chelmesford, MA (US)

( * ) Notice: Subject to any disclaimer, the term of this patent is extended or adjusted under 35 U.S.C. 154(b) by 0 days.

(21) Appl. No.: 16/551,625

(22) Filed: Aug. 26, 2019

Related U.S. Application Data

(63) Continuation of application No. 15/437,182, filed on Feb. 20, 2017, now abandoned.

(51) Int. Cl.
  *H04L 12/24* (2006.01)
  *G06F 3/0481* (2013.01)

(52) U.S. Cl.
  CPC ...... *H04L 41/0806* (2013.01); *G06F 3/04815* (2013.01); *H04L 41/12* (2013.01); *H04L 41/20* (2013.01)

(58) Field of Classification Search
  CPC . G06F 9/5044; G06F 8/10; G06F 8/60; G06F 9/5055; H04L 43/08
  See application file for complete search history.

(56) References Cited

U.S. PATENT DOCUMENTS

| 9,544,842 | B2 * | 1/2017 | Cui | H04W 48/18 |
| 9,571,889 | B2 * | 2/2017 | Rys | H04N 21/4532 |
| 2005/0155033 | A1 * | 7/2005 | Luoffo | G06F 9/5088 718/104 |
| 2007/0011281 | A1 * | 1/2007 | Jhoney | G06Q 10/10 709/220 |
| 2008/0062934 | A1 * | 3/2008 | Zhao | H04W 48/18 370/332 |
| 2011/0022626 | A1 * | 1/2011 | Plache | G05B 19/056 707/769 |
| 2012/0005236 | A1 * | 1/2012 | Deng | G06F 8/10 707/798 |
| 2012/0173729 | A1 * | 7/2012 | Lee | G06F 9/5044 709/226 |
| 2013/0067461 | A1 * | 3/2013 | Taragin | G06F 9/5044 717/176 |
| 2014/0040473 | A1 * | 2/2014 | Ho | G06F 9/5072 709/226 |
| 2015/0019722 | A1 * | 1/2015 | Narayanan | H04L 41/12 709/224 |

(Continued)

FOREIGN PATENT DOCUMENTS

EP  2637381 A1 * 9/2013  ............. H04W 4/50

*Primary Examiner* — Shean Tokuta
(74) *Attorney, Agent, or Firm* — Robert Schuler

(57) ABSTRACT

A system for identifying networked equipment on which to operate a computer software application has a store of currently available capability information associated with equipment connected to a communication network, a store of software application operational requirement information and an intent driven controller. The controller operates to identify networked equipment on which to run the software application by comparing application requirement information to currently available capability information associated with instances of the networked equipment looking for capability that satisfies the operational requirements.

11 Claims, 15 Drawing Sheets

(56) References Cited

U.S. PATENT DOCUMENTS

| | | | | |
|---|---|---|---|---|
| 2015/0142978 A1* | 5/2015 | Anderson | ............. | G06F 9/5044 |
| | | | | 709/226 |
| 2015/0339059 A1* | 11/2015 | Kang | ...................... | G06F 3/064 |
| | | | | 711/154 |
| 2016/0021546 A1* | 1/2016 | Cuervo | ................... | H04L 41/12 |
| | | | | 370/254 |
| 2017/0064691 A1* | 3/2017 | Kubota | ................. | H04W 48/18 |
| 2017/0142649 A1* | 5/2017 | El-Moussa | ............ | H04W 48/20 |
| 2017/0244987 A1* | 8/2017 | Christie | ............... | H04N 21/258 |
| 2017/0331687 A1* | 11/2017 | Crickett | .............. | H04L 41/0823 |
| 2017/0346691 A1* | 11/2017 | Crickett | .............. | H04L 41/0823 |
| 2018/0115468 A1* | 4/2018 | Bildhauer | ............ | H04L 41/5058 |
| 2018/0262979 A1* | 9/2018 | Wang | ................... | H04W 48/18 |
| 2018/0268419 A1* | 9/2018 | Zeckser | ................. | G06Q 50/10 |
| 2018/0337848 A1* | 11/2018 | Bhaskar | .............. | H04L 12/6418 |
| 2019/0158537 A1* | 5/2019 | Miriyala | .............. | G06F 21/606 |
| 2019/0342354 A1* | 11/2019 | Bosch | ..................... | H04L 67/10 |

\* cited by examiner

ORDERING ALGORITHM 800

US 10,862,748 B1

INTENT DRIVEN CONTROLLER FOR PROVISIONING SOFTWARE APPLICATIONS ON NETWORKED EQUIPMENT

1. FIELD OF THE INVENTION

The present disclosure relates to managing software applications on networked computer infrastructure and to a controller for provisioning that networked infrastructure in a manner that makes very efficient use of the infrastructure capabilities.

2. BACKGROUND

Existing network infrastructure provisioning methodologies require stitching networked equipment together by performing a series of distinct tasks such as configuring VLANs, IP subnets, routing protocols and possibly overlays. This approach requires that an administrator manually translate application requirements into network configuration based on knowledge of the deployed equipment and its operational software.

3. BRIEF DESCRIPTION OF THE DRAWINGS

The present invention can be best understood by reading the specification with reference to the following figures, in which.

4. DETAILED DESCRIPTION

Figure 1:
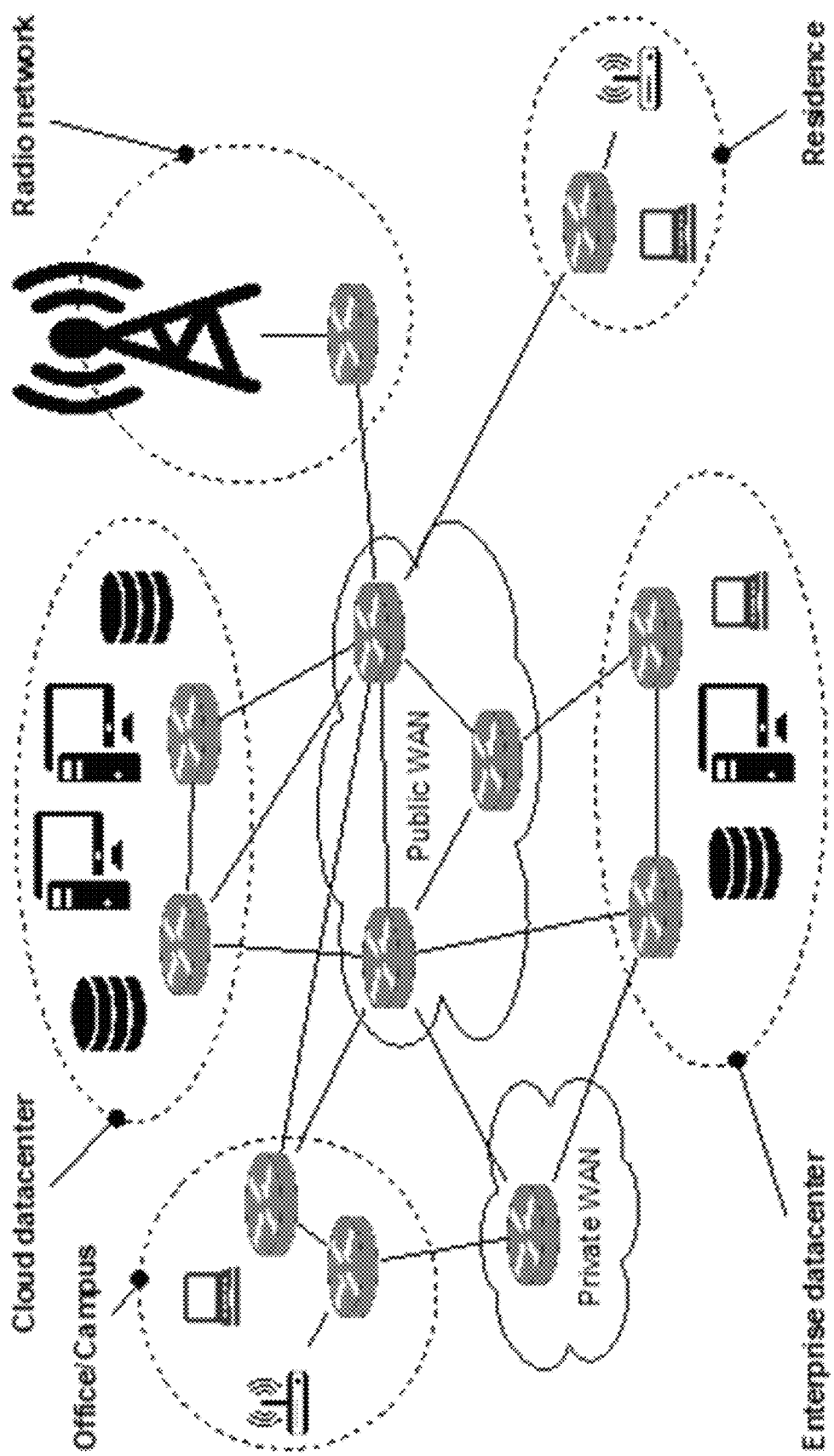
FIG. 1 is a diagram showing a network arrangement having several different sites.

Software applications can be implemented as a collection of separate services that are configured to communicate with each other to perform some functionality. Each one of a plurality of services comprising a computer application are typically referred to as a microservice. The current largely manual process employed to identify computer equipment that is connected to a network (network-connected equipment or networked equipment) on which to best place and run microservices to meet a set of operational requirements associated with each microservice is both time consuming and does not necessarily result in an optimal flow of network traffic from one point in the network to another.

I have designed a network infrastructure controller having functionality that operates to quickly and automatically identify networked equipment on which to place and run each microservice. This infrastructure controller is referred to here as an intent driven controller (IDC), and it has functionality that operates to automatically identify one or more instances of networked equipment that are capable of at least minimally satisfying a set, or a sub-set, of operational requirements associated with each microservice comprising a computer application. Subsequent to identifying the one or more instances of networked equipment, the IDC can operate to place each microservice on the networked equipment that is identified as being capable of at least minimally satisfying the operational requirements of the microservice.

According to one embodiment, the IDC compares operational requirement information associated with each of a plurality of microservices with available capability information associated with networked equipment to identify which equipment is able to best satisfy the operational requirements of each microservice. The networked equipment can be any type of device having processing and/or forwarding functionality that is connected to the network by one or more communication channels. The available capability information associated with a processing element, forwarding element and communication channel can be learned by the IDC, or provided by a network administrator, and maintained in a file or record in a non-transitory computer readable medium accessible by the IDC. Further, the application operating requirements specified for each microservice comprising a computer software application can be maintained in any appropriate non-transitory computer readable medium that is accessible to the IDC.

According to another embodiment, the IDC can operate to prioritize the order in which applications are operated on for placement of the microservices into the networked equipment.

According to yet another embodiment, the operational requirement information for each computer application is maintained for use by the IDC in separate files or database records that are referred to here as computer application requirement models, and each model has operational requirement information relating to microservices. Each model can be comprised of one or more stages, and each stage can correspond to compute, memory and storage requirements of a microservice or to communication requirements of the microservice. In the case that the model is a single stage model, the single stage can correspond to a set of compute, memory and storage requirements for one or more identical microservices comprising a computer application. And in the case that the model is comprised of multiple stages, each stage can correspond to either a set of computer, memory and storage requirements or a set of communication requirements for a microservice comprising the application. Each stage can be uniquely identified by a universal unique-identifier (UUID) for example, and each identifier can point to either a set of compute, memory and storage requirements (i.e., "cube.N", with N being an integer number) associated with a microservice, or it can point to a set of communication requirements (i.e., "sphere.N", with N being an integer number) associated with the microservice that at least minimally satisfies the operating needs of that micro service. Each stage in the computer application model can be connected by what is referred to here as a joint to another stage (provided there are two or more stages in the model), and the joined stages together represent a model of the requirements that the computer application needs to operate.

Referring now to FIG. 1, this figure shows a number of different sites (datacenters, corporate offices, campus, residences, radio/satellite facilities) with local networks (LANs) that are interconnected by public or private wide area networks (WANs). A site can use wired and wireless networks to connect a variety of devices (computation and storage systems, sensors, actuators, printers, smart phones, tablets, etc.). Such devices provide one or more abstract compute, input, output, storage and communication functions. A system is a clustering of such devices located within, partially within, or across one or more sites. We refer to the communication functions in such devices as forwarding elements (whether they represent individual enclosures or integrated functionality) connected by communication channels as the abstraction for communication flows irrespective of OSI layer. Similarly, we refer to the input, output, storage and compute functions as processing elements. In FIG. 1, the forwarding elements relay, mirror or filter communication traffic, and the processing elements produce, consume, retain or transform the data as carried by communication channels and forwarding elements. Note that processing and forwarding elements may be physically combined in one device (for instance a compute server that can relay traffic between Ethernet ports).

Figure 2A:
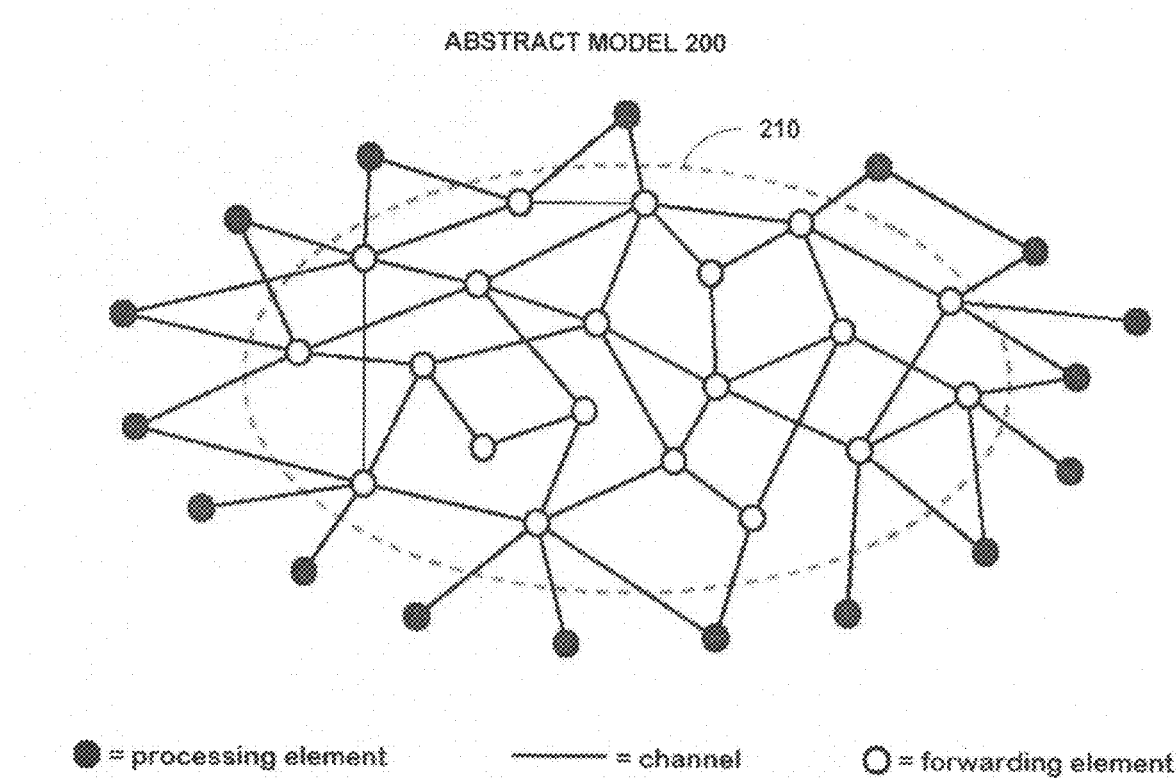
FIG. 2A is a diagram illustrating an abstract representation of a network 200 showing forwarding and processing elements and channels connecting these elements.

FIG. 2A illustrates a communication network 200 and the relationships between processing elements and forwarding elements linked by communication channels, and having all of the forwarding elements being shown inside a dashed oval 210. The processing elements (PE), forwarding elements (FE) and channels (CH) can be uniquely identified. Each processing element is illustrated by a black filled circle, each forwarding element is illustrated by an unfilled circle, and each channel is illustrated by a line connecting processing and/or forwarding elements. For the purpose of this description, a portion or segment of the network 200 described above is illustrated in FIG. 2B. This network segment has four processing elements labeled PE201.1 to PE201.4, two forwarding elements labeled FE202.1 and FE202.2, and has 9 communication channels, five of which are labeled CH203.1 to CH203.5.

Figure 3:
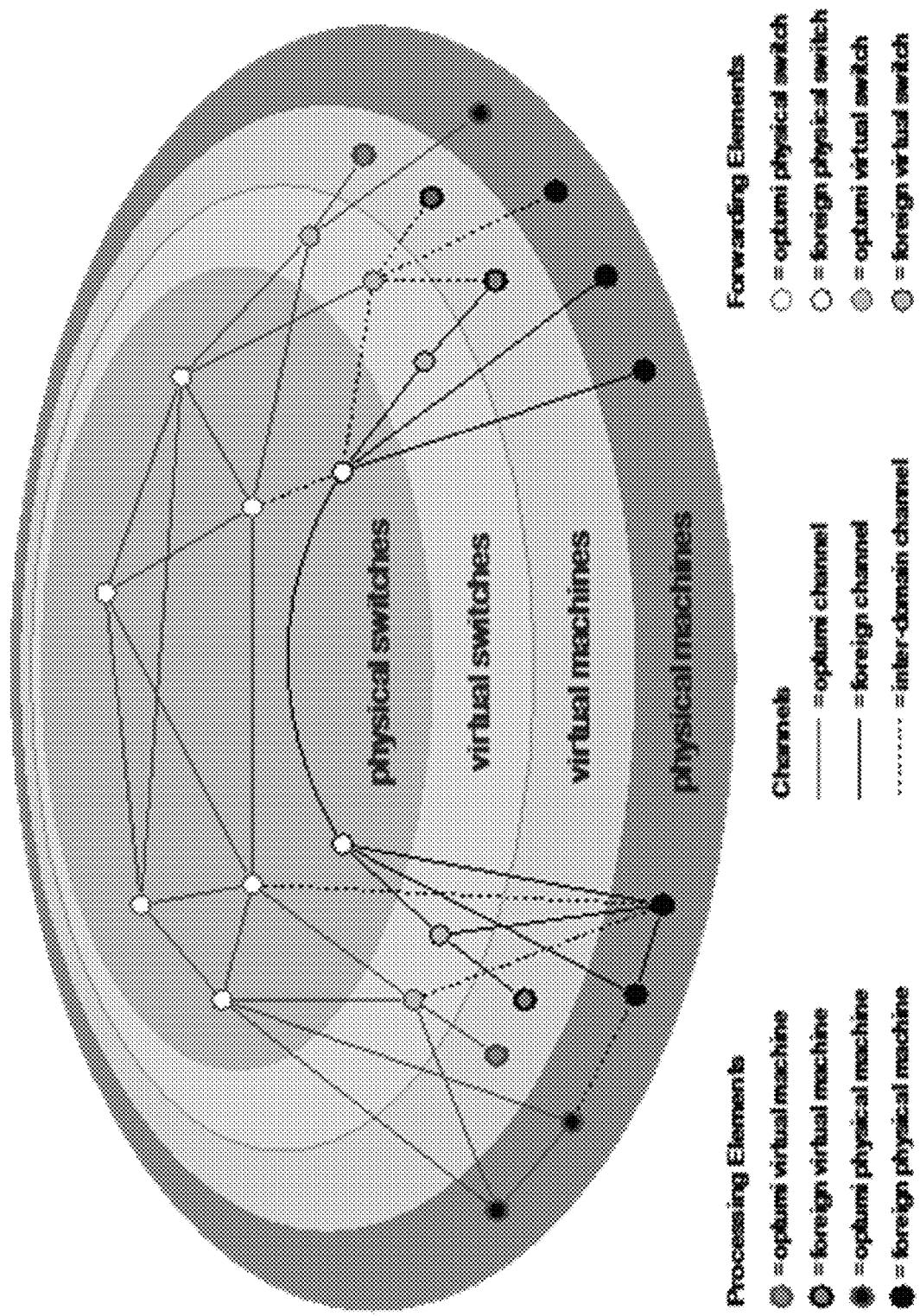
FIG. 3 is a diagram illustrating a network having intent driven controller elements and non-intent driven controller elements.

FIG. 3 refers to Intent Driven Controller (IDC) elements as Intent Driven Controller physical or virtual machines or Intent Driven Controller physical or virtual switches, and displays the forwarding and processing elements in four rings, labeled 300, 310, 320, and 330, with Intent Driven Controller elements and communication channels, the latter illustrated as solid lines, and conventional, non-Intent Driven Controller elements and communication channels, the latter being illustrated as dashed lines. It illustrates interconnections of forwarding and processing elements and shows how an Intent Driven Controller network might co-exist with or exchange traffic with a conventional, non-Intent Driven Controller network using inter-domain communication channels, the latter illustrated by dotted lines. Within a given system, one or more Intent Driven Controllers provide for communication among processing elements by operating forwarding elements and communication channels. The Intent Driven Controllers are comprised of software programs that execute on physical or virtual computers and communicate with one or more forwarding elements and communication channels under their control. Hereinafter, an Intent Driven Controller is referred to as an IDC.

Forwarding elements, processing elements, communication channels and controllers all have attributes—whether implemented in hardware, firmware or software—that we separate into three distinct categories as capabilities, configuration and state. In this regard, capabilities are immutable attributes that describe inherent functions, features or operating aspects which includes, but is not limited to, information across various ISO layers like number of ports, possible line speeds, alternative signal encodings, propagation delay characteristics, internal table capacities, functional abilities and various internal compositions such as the presence of crossbars to forward signal streams, switches to forward frames, routers to forward datagrams, etc. Configuration refers to dynamic attributes that can only be changed through administrative action and includes, but is not limited to, information like enabling and disabling features, protocol options, operating limits. Examples are permitted line speeds, turning auto-negotiation on and off, encryption settings, overclocking a device and manipulating forwarding behavior in crossbars, switches and routers. State refers to dynamic information that is modified as a result of autonomous operation and includes, but is not limited to, statistics counters, learned forwarding behavior, auto-negotiated line rates. While it is noted that some functionality might appear to fit more than one description, this may be an indication that they are different attributes. For instance, line speed could refer to the set of line speeds a device can support (capability), or the set of line speeds a device is permitted to support (configuration) or the actual line speed with which it is currently operating (state).

Figure 4A:
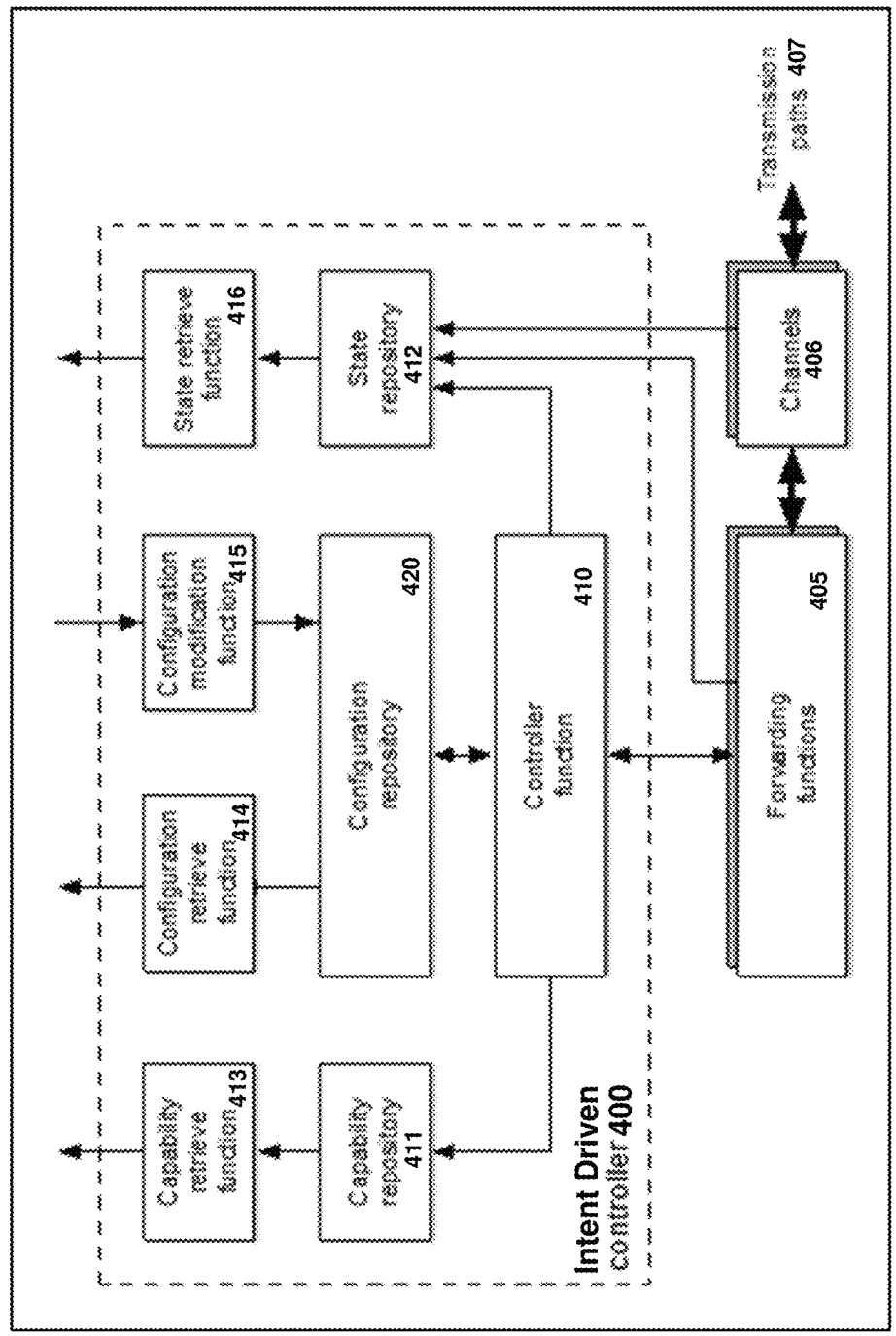
FIG. 4A is a diagram showing functional blocks comprising one embodiment of an intent driven controller 400.

FIG. 4A shows functional elements comprising one embodiment of an intent driven controller (IDC) 400 in communication with one or more forwarding functions 405 and communication channels 406, wherein a forwarding function may represent a forwarding controller or a simpler device such as a serial bus that allows the controller to communicate over a communication channel. The IDC 400 is comprised of a controller function 410, a configuration repository 420, a capability repository 411, a capability retrieve function 413, a configuration retrieve function 414, a configuration modification function 415, a state retrieve function 416, and a state repository 412. The capability retrieve function 413 operates to enable the retrieval of the capabilities of the IDC 400. The capability repository 411 represents the capabilities of the IDC and all of the forwarding functions 405 and communication channels 406 that can be operated by the controller. The configuration retrieve function 414 operates to enable the retrieval of current and possibly past configurations of the IDC and any forwarding functions and communication channels under its operation. The configuration modification function 415 enables the modification of the current or any alternative configuration of the IDC and any forwarding functions and communication channels under its operation. The configuration repository 420 represents the current and possibly past configuration of the IDC and any forwarding functions and communication channels under its operation. The state retrieve function 416 enables the retrieval of the current and possibly past state of the IDC and any forwarding functions and communication channels under its operation. The state repository represents the current and possibly past state of the IDC and any forwarding functions and communication channels under its operation, and the controller function 410 represents the core IDC function that controls the behavior of the forwarding functions and the communication channels under its operation in order to forward communication traffic as indicated by the information in the configuration repository. In addition, it assists in determining the capabilities, state and configuration of the forwarding functions and communication channels.

Figure 5A:
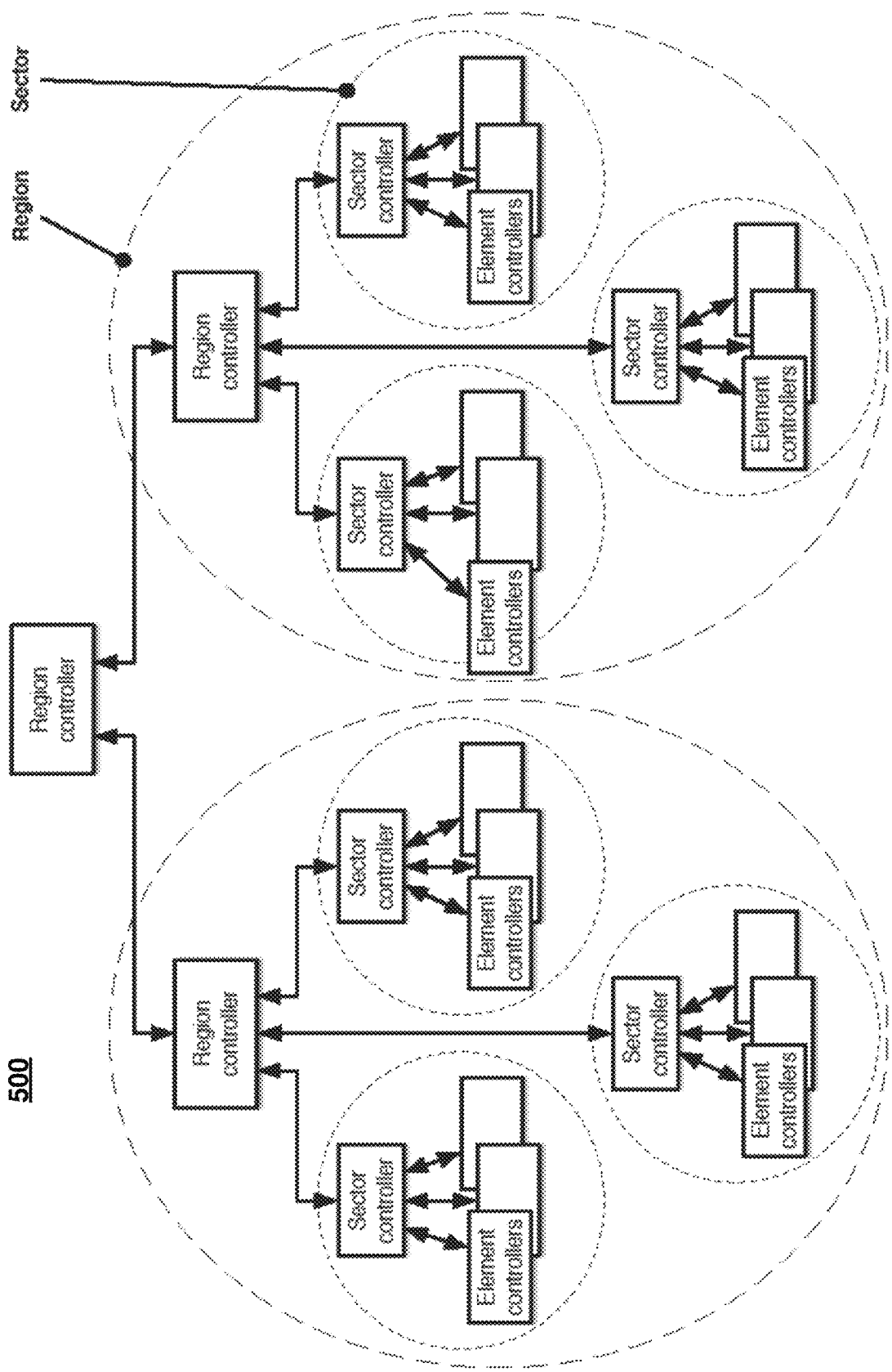
FIG. 5A is a diagram showing the organization of sector and region intent driven controllers in a hierarchical control plane 500.

Multiple IDCs, described with reference to FIG. 4A, can cooperate in a hierarchical manner to enable intent-driven provisioning of networked equipment The element controller is responsible for one or more processing elements, forwarding elements and communication channels. As shown in FIG. 5A, a sector IDC is responsible for the provisioning of all the element IDCs in its sector, and a region IDC is responsible for the provisioning behavior of all the forwarding elements in its subordinate region and sector IDCs. The forwarding behavior required to render a communication service is orchestrated by the unique region or sector IDC that is lowest in the IDC hierarchy and responsible for all the forwarding elements that are attached to endpoints involved in the communication service. FIG. 5A shows the organization of sector and region IDCs to form a hierarchical control plane 500. Each element, sector and region IDC provides an API to create, modify and retrieve the configuration of the given networked equipment, to retrieve the state of the given networked equipment, and to retrieve the capabilities of the given networked equipment.

IDCs in the controller organization can communicate with each other using forwarding functions and communication channels (illustrated in FIG. 4), either dedicated to control plane communication (out-of-band control) or shared with the data plane (in-band control).

Figure 4B:
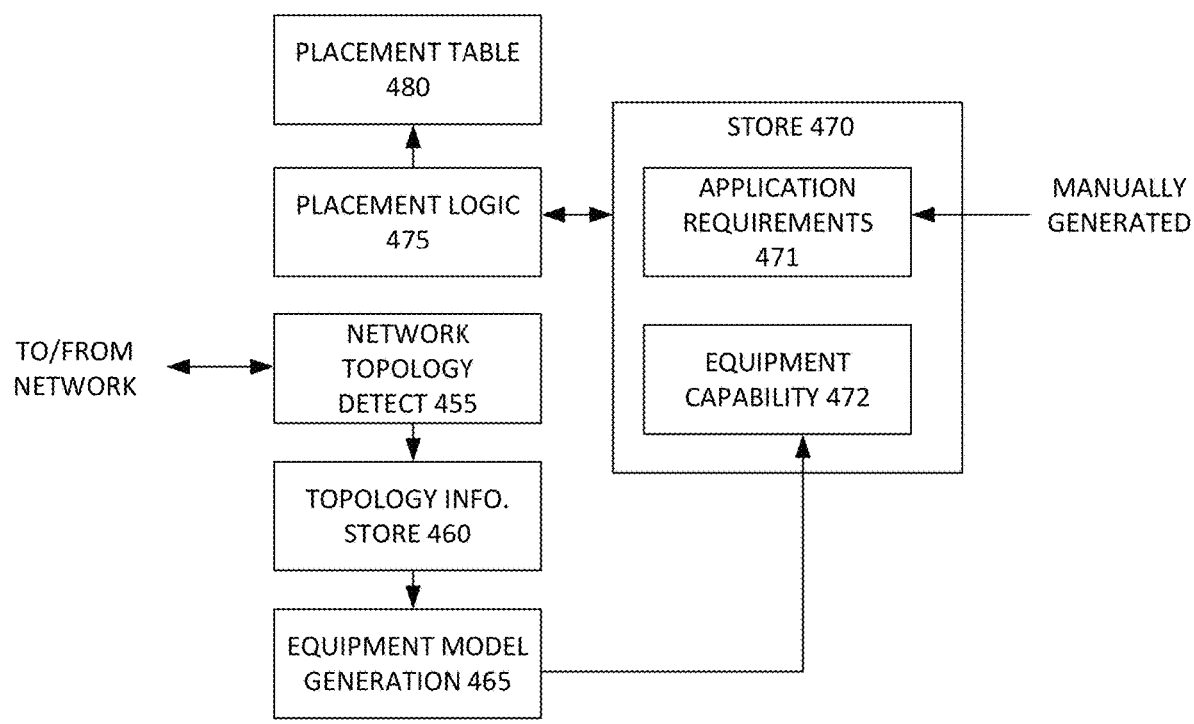
FIG. 4B is a diagram showing functional blocks comprising a second embodiment of an intent driven controller 450.

FIG. 4B illustrates functionality comprising a second embodiment of an intent driven controller (IDC) 450, which can operate to identify one or more instances of networked equipment on which each one or more of a plurality of microservices can be placed such that the operating requirements for each microservice are at least minimally satisfied. A microservice comprising a computer application is typically able to run if it is provided with some combination of processing, forwarding and communication channel capabilities. Further, the performance of a microservice can be improved or optimized if the microservice does not have to compete with other applications for equipment capabilities. Typically, a range of computer application processing, memory and storage requirements are specified by the application vendor, and so the controller can be configured with a range of operational requirements (minimum requirements to maximum specified requirements) for each computer application it is responsible for placing. FIG. 4B is a block diagram showing functionality comprising the IDC 450 that can operate to identify networked equipment, on which to place a microservice, that has capabilities that are available to support the operation of a computer application such that it is able to run in at least a minimal efficiency. The IDC 450 has a network topology detection/generation function 455, a network topology information store 460, a networked equipment model generation function 465, an intelligent computer application placement engine having placement logic 475, an application placement table 480, and a store 470 for maintaining computer software application requirements and available networked equipment capabilities. In the event that a network topology can be discovered, the topology detection or generation function 455 operates to detect the identity (i.e., MAC address) and capabilities of networked equipment comprising a local and/or wide-area network. Any of the commonly available network discovery tools can be employed to detect network topology, such as the Simple Network Management Protocol (SNMP), and the topology information detected by function 455 can be maintained in the store 460. On the other hand, as is often the case, equipment connected to communication networks and the capabilities of that equipment are not easily discovered, and in this case the network topology can be provided by a network administrator. As described herein, networked equipment can be comprised of processing elements/nodes, forwarding elements/nodes and communication channels. A more detailed description of the network topology information maintained in the store 460 will be described later with reference to FIG. 4C. Regardless of the means by which network topology information is discovered or provided, the function 465 operates on the topology information maintained in the store 460 to generate equipment capability information for each instance of networked equipment. The available capability information associated with each instance of networked equipment can be maintained in a computer file in a table 472 comprising the model store 470. Each file is referred to herein as a networked equipment capability model or simply capability model. The available equipment capability information in each model can be used by the logic 475 to identify processing elements and forwarding elements (and associated communication channels) on which to place a microservice. A more detailed description of the table 472 will be described later with reference to FIG. 4D.

With continued reference to FIG. 4B, in addition to the equipment model table 472, the store 470 maintains operational requirement information for each computer software application in separate computer files comprising a store 471. Each file can be generated manually by a network administrator, or automatically by a requirements generation tool specially designed for this purpose. More specifically, each microservice comprising a computer application can be assigned a set of operational requirement information, and each set of the application operational requirement information can be maintained in a file in the table 471 for use by the logic 475. Each set of microservice requirements in a file has compute, memory, storage and communication information for the operation of a microservice comprising each application associated with the computer software application, and each set of operational requirements is referred to here as an application requirements model. A more detailed description of the information comprising an application requirements model maintained in the table 471 will be described later with reference to FIG. 4E. The information comprising the application requirements and equipment capability models can be maintained in any appropriate non-transitory, computer readable medium, such as a relational or graph database.

The placement logic 475 shown in FIG. 4B can be implemented in a number of different embodiments. In one embodiment, the logic operates on information in the application requirements and equipment capability models maintained in the tables 471 and 472 respectively to identify networked equipment on which to place and run each of a plurality of microservices associated with each requirements model. In another embodiment, the logic operates to provision a network to run a plurality of microservices. The logic 475 is implemented in computer instructions maintained in a non-transitory computer readable medium that is accessible by the controller 450. A more detailed description of the operation of the logic 475 to identify networked equipment on which to place and run a microservice will be described later with reference to FIG. 7. The result of the logic 475 operating on the information in the store 470 is a listing of microservices and the identity of networked equipment on which each listed microservice can be installed, and this listing is maintained in the placement table 480.

Figure 4C:
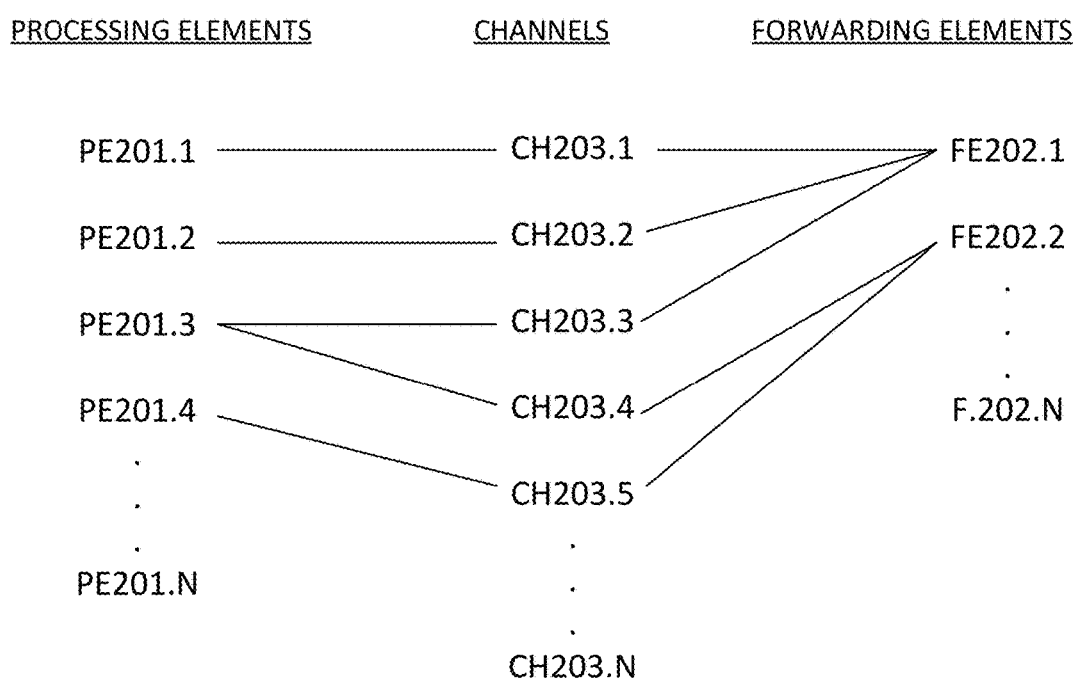
FIG. 4C is a diagram illustrating a format in which networked equipment can be maintained in a store 460.

As described earlier with reference to FIG. 4B, the topology detection/generation functionality 455 operates to identify and map (or to receive topology information from a network administrator to be mapped) different types of networked equipment comprising a communication network, such as processing elements, forwarding elements, communication channels and the connectivity among them. The functionality 455 can also operate to identify or receive capabilities associated with each of these networked elements. FIG. 4C illustrates a format in which network topology information can be maintained.

Figure 2B:
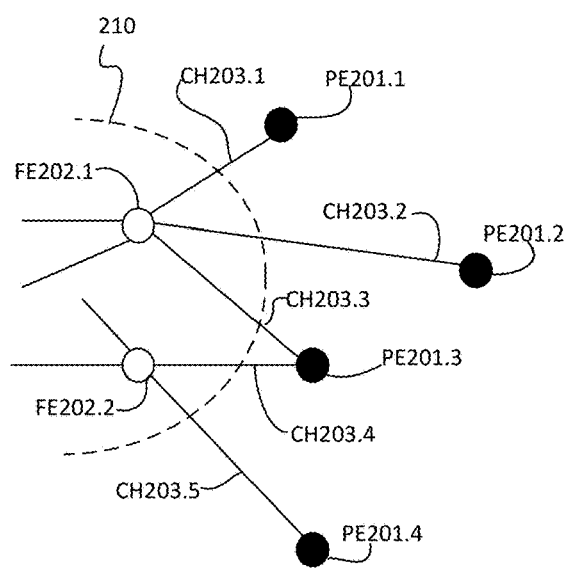
FIG. 2B shows a portion of the network 200.

As shown in FIG. 4C, the store 460 has a listing of the processing elements labeled PE201.1 to PE201.N, channels labeled CH203.1 to 203.N, and forwarding elements labeled FE202.1 to 202.N comprising the network 200 described with reference to FIG. 2B. The store 460 illustrates logical relationships between processing elements, communication channels and forwarding elements comprising the section of the network 200 shown with reference to FIG. 2B.

As indicated earlier with reference to FIG. 4B, the store 470 can maintain a listing of equipment comprising the network 200 in an equipment capability store 472. Each instance of networked equipment (i.e., processing element, forwarding element, and communication channel) in the listing is comprised of a set of available capability information. The set of available capability information pertaining to each instance of the networked equipment is maintained in a networked equipment capability model, or simply an equipment capability model, and each processing element, forwarding element and communication channel in the network 200 of FIG. 2A can be associated with an equipment capability model. Some instances of networked equipment can be associated with the same model, and some can be associated with different models. One embodiment of a store for maintaining available networked equipment capability is now described with reference to FIG. 4D.

Figure 4D:
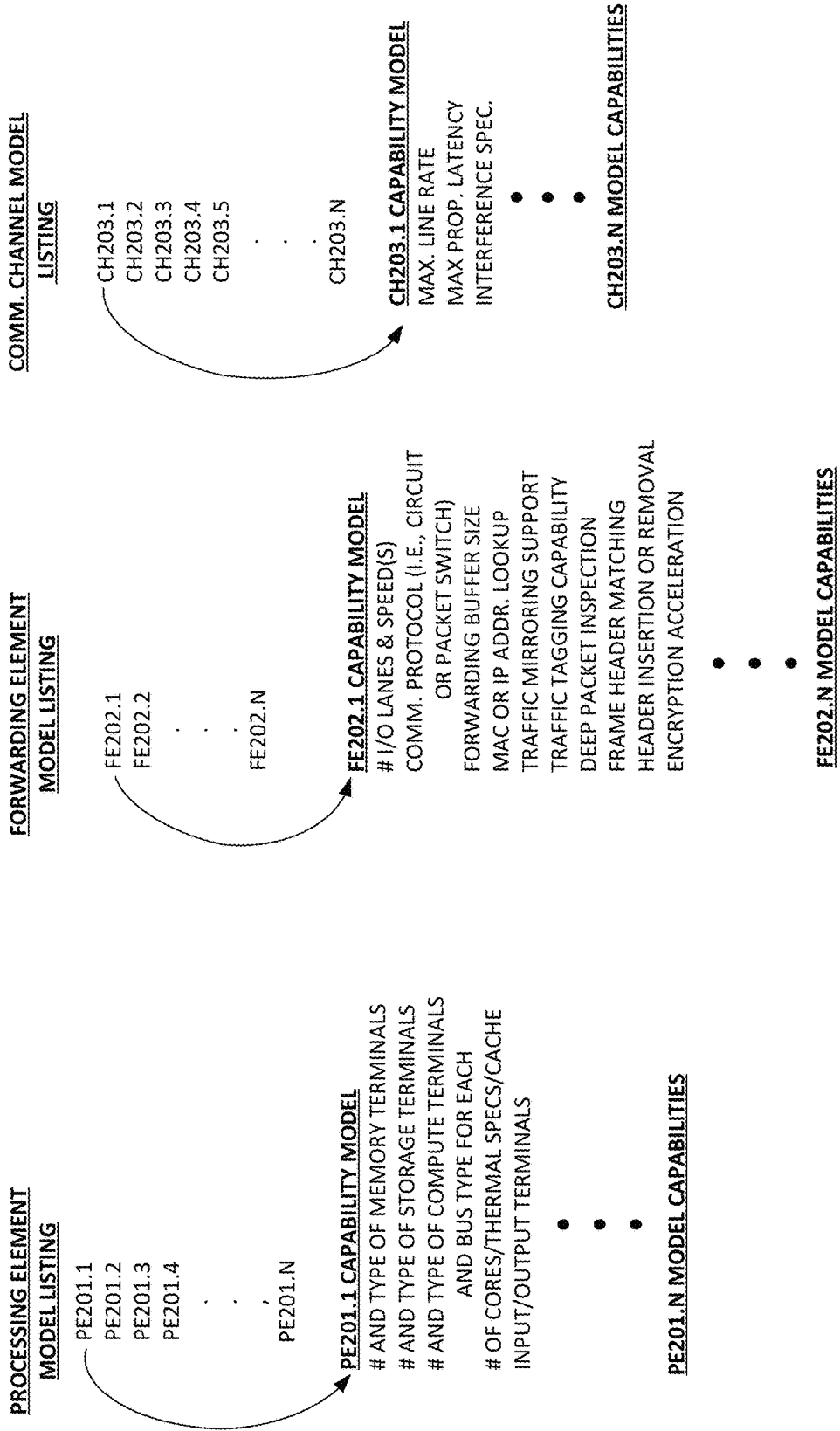
FIG. 4D is a diagram illustrating a format in which networked equipment capabilities can be maintained in a store 472.

The store 472 in FIG. 4D shows a format in which elements comprising the network 200 can be maintained. Specifically, the identities of processing elements, PE201.1 to PE201.N, forwarding elements FE202.1-FE202.N, and communication channels CH203.1-CH203.N can be maintained in memory locations that are accessible to the logic 475. The identity of each networked element can be a pointer to a set of available network capabilities that can be analyzed when determining where to place a microservice. Each set of available network capabilities is maintained in a capability model as described above and illustrated in FIG. 4D. So, for example, the identity of the processing element PE201.1 is a pointer to a capability model labeled PE201.1 CAPABILITY MODEL. Similarly, the identities of each of the forwarding elements and communication channels listed in the store 472 are pointers to capability models having sets of available capabilities associated with the forwarding elements and communication channel models. All of the information comprising the store 472 can be maintained in a non-volatile computer readable medium that is accessible by the logic 475. The capabilities listed in FIG. 4D are for illustrative purposes only, and it should be understood that each different type of model (PE, FE or comm. channel) can be comprised of more or fewer capabilities of the same or different types.

Figure 4E:
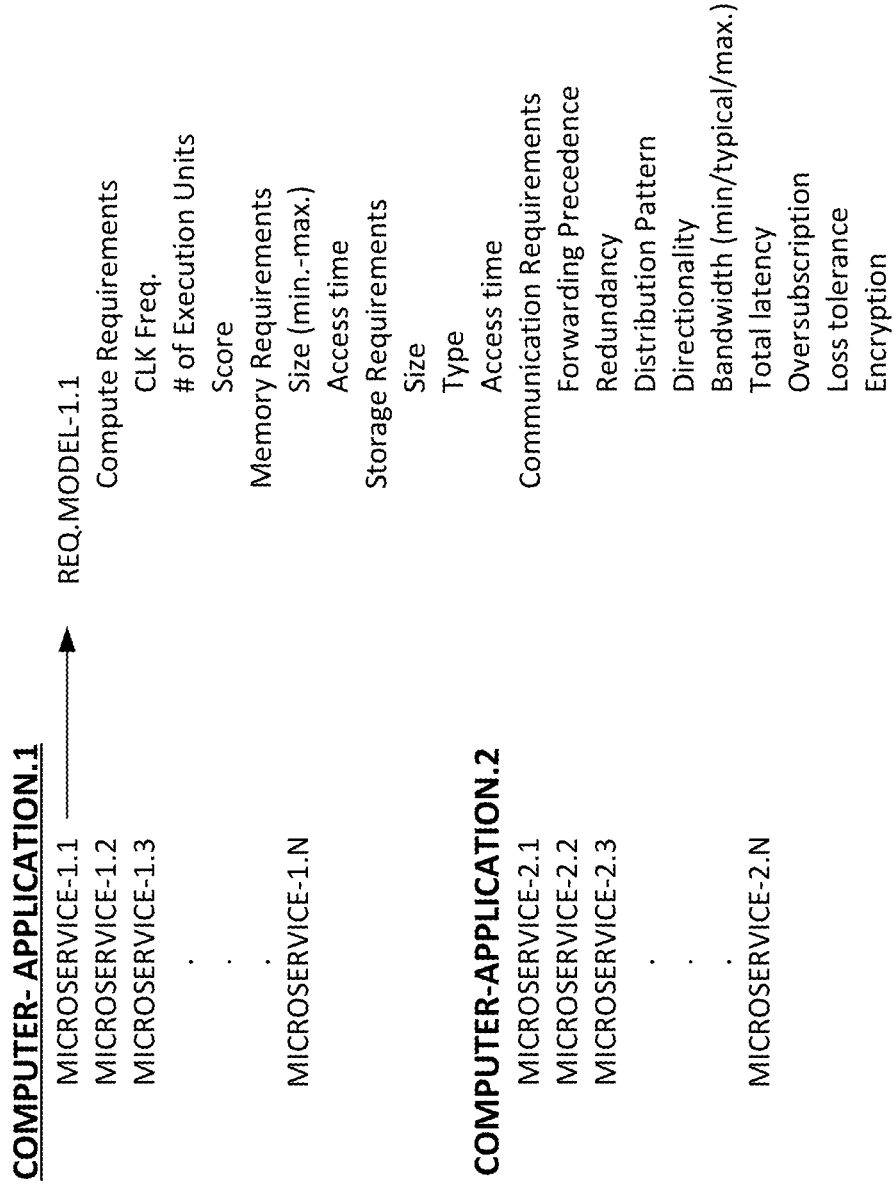
FIG. 4E is a diagram illustrating a format in which computer application operational requirements can be maintained in a store 471.

FIG. 4E is a diagram showing a format in which operational requirements associated with each of a plurality of microservices comprising a computer application can be maintained in the store 471 described earlier with reference to FIG. 4B. For illustrative purposes, only two computer applications, COMPUTER-APPLICATION.1 and COMPUTER-APPLICATION.2, are listed in the store 471, but it should be understood that more or fewer computer applications can be listed. Each computer application listed in the store 471 has a plurality of microservices, and each microservice is associated with a set of application operational requirements, and each set of operational requirements can be comprised of some or all of processing, memory, storage and communication requirement information. The operational requirement information comprising each set is maintained in a computer file that is referred to here as an application operational requirement model. The information in each file can be maintained in a non-volatile, computer readable medium accessible by the logic 475, and the logic 475 can operate on the information in a requirements model to determine on which networked equipment to place a microservice.

Continuing to refer to FIG. 4E, the store 471 can list the identities of a plurality of computer applications and associated microservice identities, and each microservice identity can be used by the logic 475 as a pointer to information required by each microservice to operate. As described earlier, FIG. 4E lists two applications, labeled COMPUTER-APPLICATION.1 and COMPUTER-APPLICATION.2. Each application can be comprised of one or more microservices that can be placed in networked equipment identified by the placement logic 475. The identity of a microservice, such as MICROSERVICE-1.1, serves as a pointer to application requirement information maintained in a requirement model, such as the requirement model REQ.MODEL-1.1. and each requirement model has of a set of requirement information that can be comprised of some or all of a compute, memory, storage and communication requirement that are specified for the operation of each microservice. Each type of application requirement (i.e., computer, memory, storage and communication requirements) maintained in a model can have one or more requirement elements that are specified for each microservice. The requirement model, REQ.MODEL-1.1, in FIG. 4E is comprised of four types of requirements, namely compute, memory, storage and communication type requirements. In this case, the compute requirement list CLK Freq., # of Execution Units (processor cores) and Score (processing throughput) as compute requirement elements, and each of these elements can be assigned a value that is dictated by the microservice operational needs. The elements associated with memory, and storage are well known and so will not be described here.

Continuing to refer to FIG. 4E and with reference to the communication requirement elements listed, the Forwarding Precedence element represents the forwarding priority and reservation strategy for the propagation of communication traffic. The Minimum, Typical and Maximum bandwidth needed for communication traffic are three separate elements. Oversubscription is a ratio to reduce the bandwidth requested by a communication service for sharing the more limited bandwidth available on the communication equipment. Latency is the sensitivity of communication traffic to delay. Loss tolerance is the sensitivity of communication traffic to loss of data. Encryption is the security protection of communication traffic, and forwarding confluence is the provisioned redundancy of alternative forwarding paths for communication traffic. A communication requirement element can be assigned a value (which can be a scalar or a set of scalars).

Figure 5B:
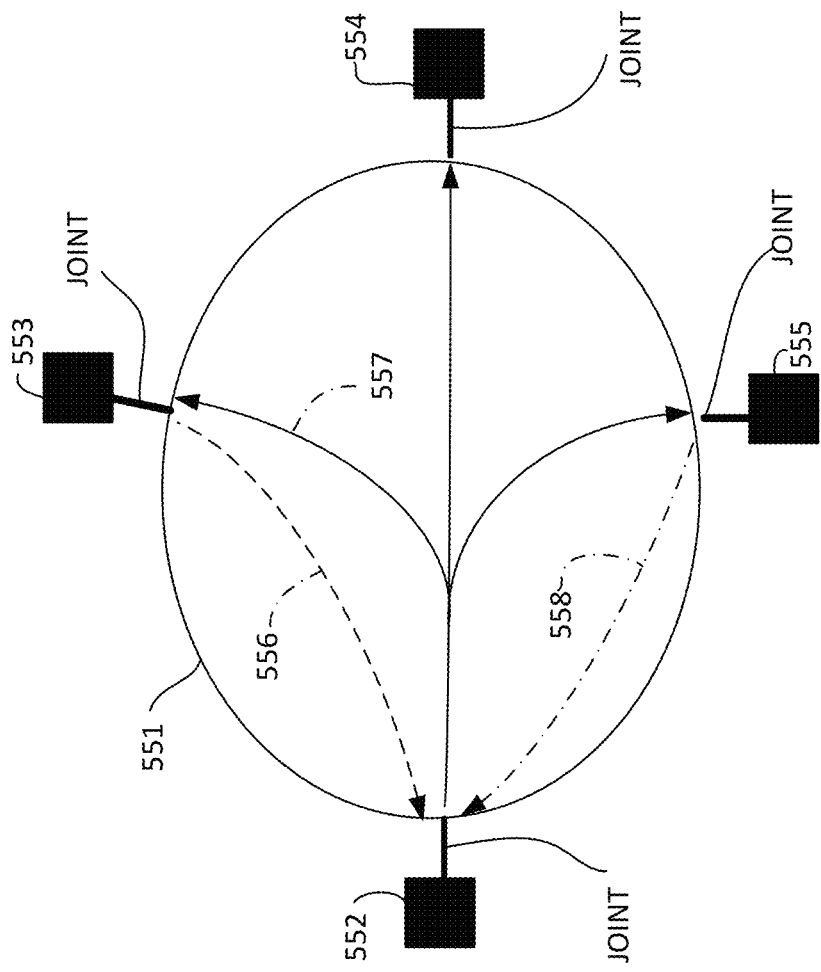
FIG. 5B is a diagram showing the elements comprising a computer application model 550.

To facilitate viewing and controlling the process followed by the logic 475 to identify networked equipment into which to place a microservice, it is useful to model the operational requirements associated with each microservice comprising a computer software application as a set of operational requirement objects. These objects can be uniquely identified for use by the logic 475, and the objects can be represented as three-dimensional geometric images to be visually displayed graphically by a GUI where they can then be edited or manipulated by a network administrator to control certain aspects of the IDC 450 operation. According to one embodiment, compute, memory and storage requirements can be modeled and displayed as a cube, and communication requirements can be modeled and displayed as a sphere. According to this embodiment, a computer application model can have one or more cubes, each of which can be connected or joined to one or more spheres. An application model 550 shown in FIG. 5B is comprised of a communication sphere 551 having a set of endpoints (labeled 552, 553, 554 and 555) that communicate over a given connectivity or distribution pattern (communication links illustrated as lines with arrows) with specific communication services where an endpoint can represent processing elements. The connectivity pattern in FIG. 5B connects the endpoints in the communication sphere 501 which is constructed of one or more superimposed forks. A fork is a unidirectional conduit or channel that propagates communication traffic from one endpoint (the input segment) to N endpoints (output segments), where N is an integer number greater than zero. FIG. 5B shows three forks labeled 556, 557, and 508. A communication service is a set of service profiles attached to a fork where a service profile is defined as a set of communication requirements with communication requirement values, and where the service profile is optionally accompanied by a traffic qualifier to narrow the applicable communication traffic. Desired communication services for a given system can be specified by a network administrator, by an application or scripts to a region, sector or element controller which will retain or distribute that information as configuration as needed to the given.

As described earlier with reference to FIG. 4B, the placement logic 475 operates to build intent-driven networks by using computer application operational requirements and networked equipment capability information to identify instances of networked equipment in which the computer application can run. This methodology is referred to here as "placing a communication service". A topography model is defined as a database that represents the connectivity among forwarding elements, processing elements and communication channels in a given system. The topography model allows us to evaluate the different options to direct communication traffic over the communication channels and forwarding elements.

Figure 6:
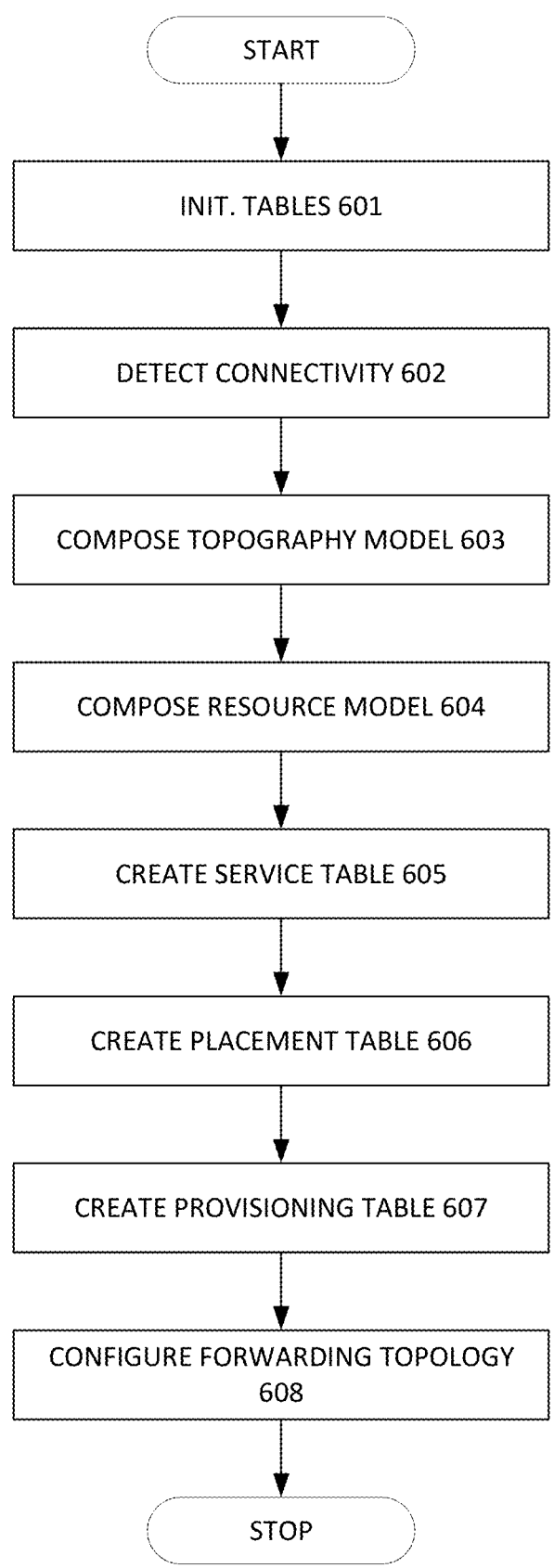
FIG. 6 is a diagram illustrating processing steps in a placement algorithm 600 used to determine optimal forwarding topologies.

FIG. 6 shows processing steps comprising one embodiment of the placement logic 475 that can be used to determine the optimal forwarding topologies for communication traffic in the communication spheres in an intent-driven communication network. At 601 one or more service tables, placement tables and provisioning tables are initialized. Then at 602 communication channels between forwarding elements are detected in a given system leveraging common detection methods. At 603 a topography model of the forwarding elements, processing elements and communication channels in the given system is composed, and at 604 a resource model of the forwarding elements, processing elements, communication channels and controllers in the given system is composed. At 605 a service table is created containing all permitted communication services in all communication spheres in the given system sorted in order of descending importance as determined by a system administrator, software program or artificial intelligence service (possibly after considering the application, subsystem or other metadata associated with the communication sphere), and at 606 a prioritized placement table is created, that lists communication services in the order they will be placed into the topography from most important to least important, by placing all communication services from the service table using an ordering algorithm described later. Then at 607, a provisioning table is created for each subsequent communication service in the placement table, starting with the first, as follows. The set of possible forwarding topologies is computed that fulfill or partially fulfill the communication service given the topography and resource models and select one to yield the provisional forwarding topology, possibly considering other communication services from the placement table to make a prescient choice among alternative topologies, the provisional forwarding topology is appended to the provisioning table, and the resource model is updated to record the resources that are claimed by the provisional forwarding topology. Then in 608, a forwarding topology is configured by reflecting all provisional topologies from the provisioning table into the forwarding elements and communication channels in order to configure their operation in accordance with these provisional topologies.

The above sequence or part thereof is re-evaluated every time the constituent steps of the algorithms incur a change that can affect the outcome (for example a communication channel becoming inoperative can lead to a new provisioned topology). Inversely, certain steps in the algorithm can be skipped if the outcome remains unchanged (for instance the topography model is not affected when the requested bandwidth for a communication sphere is changed).

Figure 7:
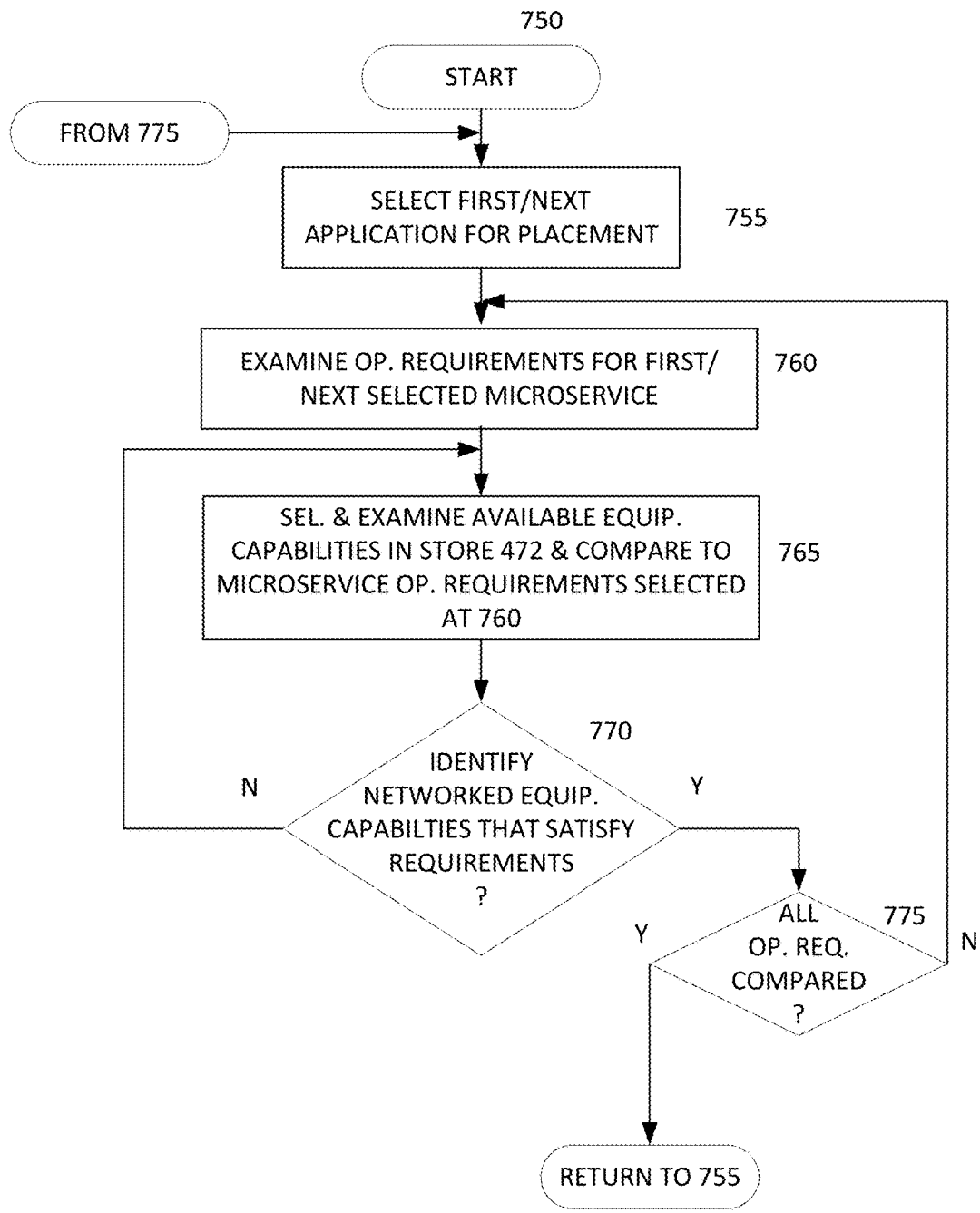
FIG. 7 is a diagram showing a logical process for identifying placement in a network for microservices.

FIG. 7 is a diagram illustrating another embodiment of the operation of the placement logic 475 that operates to determine in which networked equipment to place each one or more of a plurality of microservices comprising a computer software application. Generally, the logic 475 operates to select a computer application maintained in the store 471 for placement into a network, such as the network 200 in FIG. 2A. The logic then examines operational requirement information associated with a microservice comprising the computer application and compares this to available networked equipment capabilities looking for capability that at least minimally satisfies the operational requirements of the microservice. The applications in the store 471 can be assigned a placement priority as will be described later, and in this case the first application selected by the logic can be the highest priority application. In operation, the logical process performed by the logic 475 at 755 selects a first or next application in the listing comprising the store 471 described with reference to FIG. 4E. For example, the logic 475 can select the application identified as COMPUTER-APPLICATION.1 in the store 471. This application may or may not have been selected as the highest priority application not yet placed, but regardless, the logic at 760 can examine the operational requirements associated with one of the microservices comprising the selected computer application. In this regard, the logic may have selected the microservice identified as MICROSERVICE-1.1 in the store 471, and the identity of this microservice is a pointer to a set of operational requirements in a model, REQ.MODEL-1.1, having operational requirements associated with the microservice, which in this case are compute, memory, storage and communication requirements needed by the application to operate.

Continuing to refer to FIG. 7, at 760 the logic 475 operates to examine the operational requirement elements comprising the set of requirements in the model, and to temporarily store these requirement elements for use later at 765. Generally, the logic steps through the listings of networked equipment maintained in the store 472 looking for equipment capabilities that can support the microservice operation. For example, the logic at 765 can select an instance of a networked equipment, such as PE201.1 listed in the store 472, examine the available capabilities associated with this element that are maintained in the capability model, PE201.1 described earlier with reference to FIG. 4D, and then temporarily store the examined capabilities for later use. Then, at 770, the temporarily stored microservice operational requirements stored at 760 are compared to the available capabilities stored at 765, and if the available capabilities can at least minimally satisfy the operational requirements of the microservice, then the logic proceeds to 775 and the logic determines whether networked equipment that satisfies all of the microservice operational requirements has been identified. And if so, then the process returns to 755, otherwise the process loops back to 765 and the logic selects another network element maintained in the store 472 for evaluation. More specifically, the logic 475 at 770 compares all of the operational requirement elements in the requirement model to available networked equipment capabilities. And depending upon the communication requirements in the model, the logic can select one or more processing elements, forwarding elements and communication channel models for examination. So, for example with reference to FIG. 5B, if the logic determines that the processing element 552 has capabilities that are available to support the microservice operation, then the logic can examine the distribution pattern requirement information maintained in the model communication requirements corresponding to the microservice to determine how to distribute traffic. In the case of the model in FIG. 5B, traffic from the processing element 552 should be distributed to the networked equipment labeled 553, 554 and 555 over the communication channels labeled 557. The logic can then examine the capabilities of the channels 557 to determine whether they can support traffic from the microservice. At 775 in FIG. 7, the logic determines whether it has compared all of the operational requirements in the software application selected at 755, and if so, then the logic loops back to 755, otherwise the logic loops back to 760.

Figure 8:
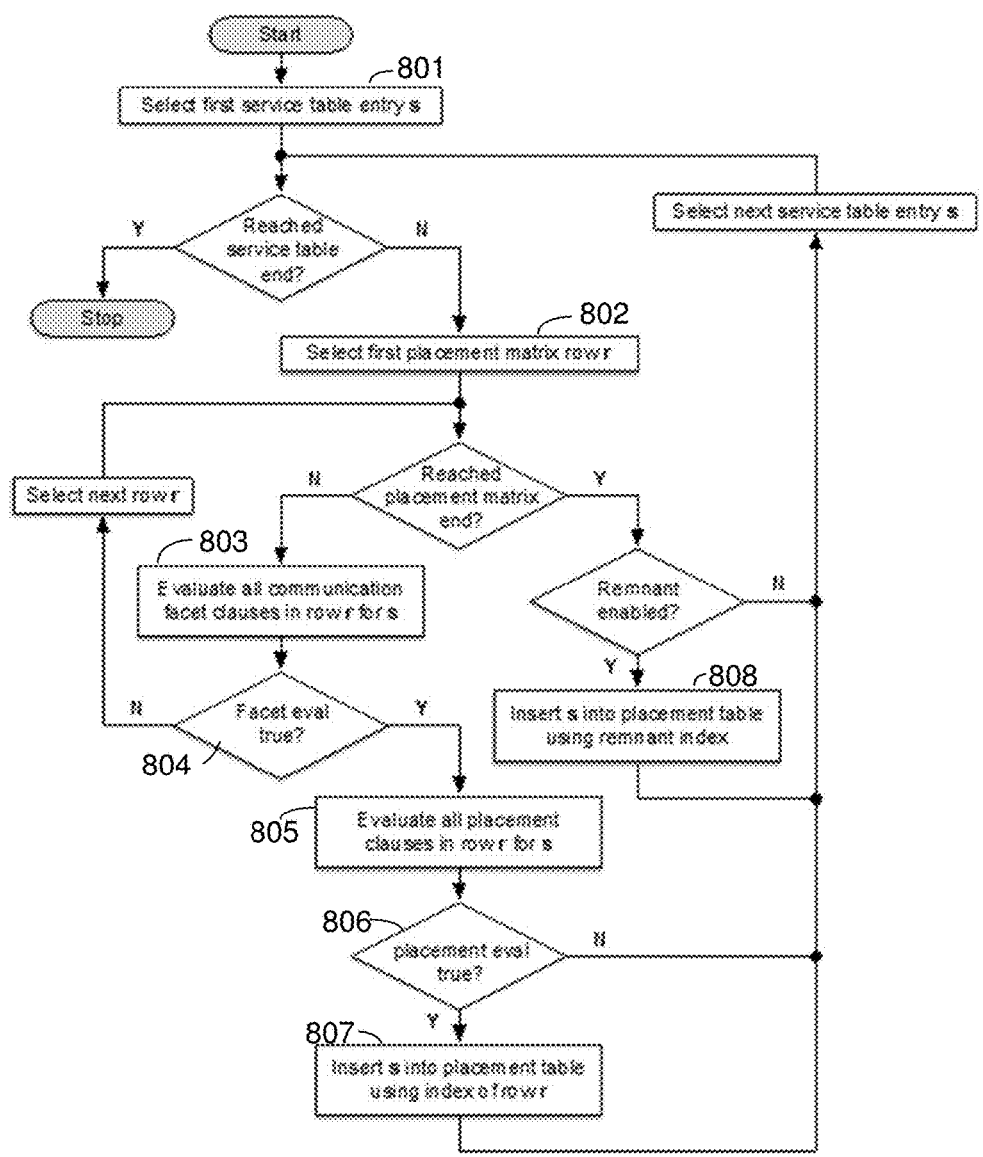
FIG. 8 is a logical flow diagram of the processing steps for an ordering algorithm 800.

FIG. 8 shows the processing steps comprising an ordering algorithm 800 that operates to generate the placement table from the service table. It is primarily driven by communication requirement elements or facets, but other aspects can be considered during ordering, for instance the application, subsystem, endpoint or communication sphere that is involved in the communication traffic.

We define a communication facet clause as a comparison of a communication facet against a given communication facet value where the comparison operator is any one of smaller than ($<$), smaller than or equal to ($\leq$), equal to ($=$), not equal to ($\neq$) greater than ($>$), or greater than or equal to ($\geq$). The comparison operator enables communication facet values to be ordered by value and thus by implied importance. Note that communication facet values may be represented by a set of one or more scalars and that the comparison operator may perform comparisons for each scalar in the set.

We define a placement clause as a simple or compound Boolean expression that resolves to true (or false) and that determines whether a service is to be placed (or not placed) in the placement table.

We define a placement matrix with R rows and C columns where each column represents a communication facet or placement condition and where each row represents a set of communication facet clauses or placement clauses each corresponding to a communication facet or placement condition in a column of the placement matrix. An administrator is allowed to modify the columns and the rows of the placement matrix or change the communication facet clauses or placement clauses they contain.

The ordering algorithm 800 can take entries from the service table and place them into the placement table in an order that is determined by the placement matrix as follows.

801. Take each subsequent entry "s" from the service table starting with the first entry.
802. Take each subsequent row "r" from the placement matrix starting with the first row.
803. Evaluate any communication facet clauses listed in row "r" of the placement matrix using the corresponding communication facet values of entry "s" and if any comparison yields false then the facet evaluation result for row "r" is false.
804. If the facet evaluation result for row "r" is false, then we perform the evaluation with the next row in the placement matrix.
805. Evaluate any placement clauses listed in row "r" of the placement matrix possibly using metadata of entry "s" and if any Boolean expression resolves to false then the placement evaluation result for row r is false.
806. If the facet evaluation result for row "r" is true but the placement evaluation result for row "r" is false, then the placement algorithm proceeds with next entry from the service table.
807. If both the facet evaluation result and the placement evaluation result for row "r" are true, then entry "s" is assigned a placement index "p" equal to the index of row "r" of the placement matrix and entry "s" is inserted into the placement table immediately after any previously placed service entries with the same placement index. The placement algorithm then proceeds with the next entry from the service table.
808. If the evaluation result is false for all rows in the placement table and a remnant placement index is configured for the given system, then entry "s" is placed into the placement table with an effective placement index equal to the remnant placement index immediately after any previously placed service entries with the remnant placement index. The placement algorithm then proceeds with the next entry in the service table.

The impact of the placement matrix is to allow the administrator to determine the order in which communication services are placed in the topography which in turn can lead to different forwarding topologies. This approach forms the basis for the administrator to affect the behavior of the forwarding elements based on high-level intent directives.

New placement aspects can be added as columns to the placement matrix and rows can be inserted or removed to provide different comparison rules. Service table entries can be expanded to specify these new placement aspects so they can be similarly processed by the placement and ordering algorithms.

If the placement matrix is empty, the resulting placement table will have all the communication services listed in the same order as the service table (depending on the configuration of any remnant placement index).

If the placement matrix contains a single row with a communication facet clause "smaller than 10 milliseconds" in the column for the latency communication facet, then all communication services that request a latency smaller than 10 milliseconds will be placed at the top of the placement table—in the same order as encountered in the service table—followed by the rest of the service table entries.

If we prepend a placement matrix row with the same "smaller than 10 milliseconds" communication facet clause and a "very high" communication facet clause for the forwarding precedence, the net effect on the placement table is that all communication services that meet both these requirements will now be listed first.

An example of a new placement aspect is a customer priority field that can be set to "high", "normal" or "low". Each service table entry would contain the value of this field (or use a default) while the placement matrix could contain a first row with a clause to match service table entries marked as "high" causing such entries to appear first in the placement table and, as a result, they are afforded better placement and forwarding topologies.

Figure 9:
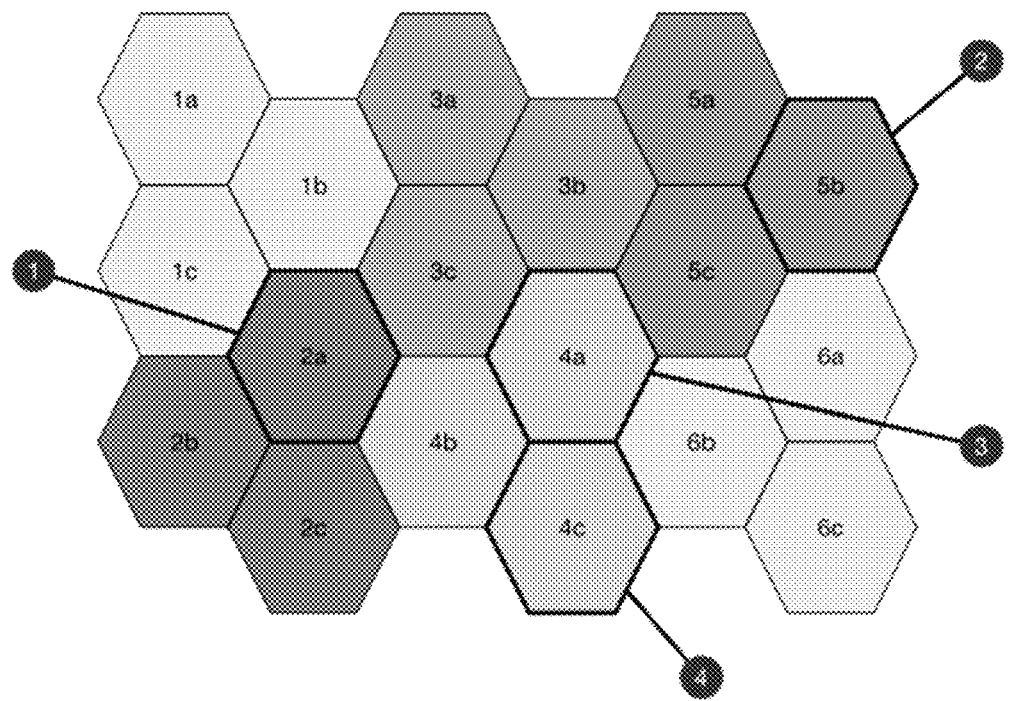
FIG. 9 is a diagram illustrating the distribution of placement algorithm execution across a plurality of intent driven controllers.

The IDCs in the controller hierarchy can cooperate to execute the placement algorithm in a single IDC or using multiple IDCs. The desired communication services in a communication sphere in a given intent-driven network involve endpoints that are attached to forwarding elements under the operational control of one or more IDCs. This set of IDCs is ultimately subordinate to a single IDC (probably a region IDC, but possibly a sector or element IDC) which can delegate the execution of the placement algorithm to its immediate subordinate IDCs as illustrated in FIG. 9. According to FIG. 9, each hexagon represents a sector (numbered 1a through 6c) and is assumed to contain forwarding elements (not explicitly shown). Adjacent sectors having the same number form a region (numbered 1 through 6). Four endpoints are also shown (presumably attached to a forwarding element in the sector with a bold edge). If a communication service for endpoints 3 and 4 needs to be placed, it can be resolved by the region controller for the blue sectors (numbered 4a through 4c). If a communication service needs to be placed for endpoints 1 and 2 a choice needs to be made whether the associated communication traffic runs through the region 3 (sectors 3a, 3b, 3c) or region 4 (sectors 4a, 4b, 4c) and this decision is made by a superior region IDC (covering regions 2, 3, 4 and 5). If it selects the region 3 (sectors 3a, 3b, 3c), it can delegate the placement for communication services inside these regions to region IDC 2, 3 and 5 which in turn can delegate the placement for communication services inside the respective sectors to the associated sector IDCs.

Figure 10:
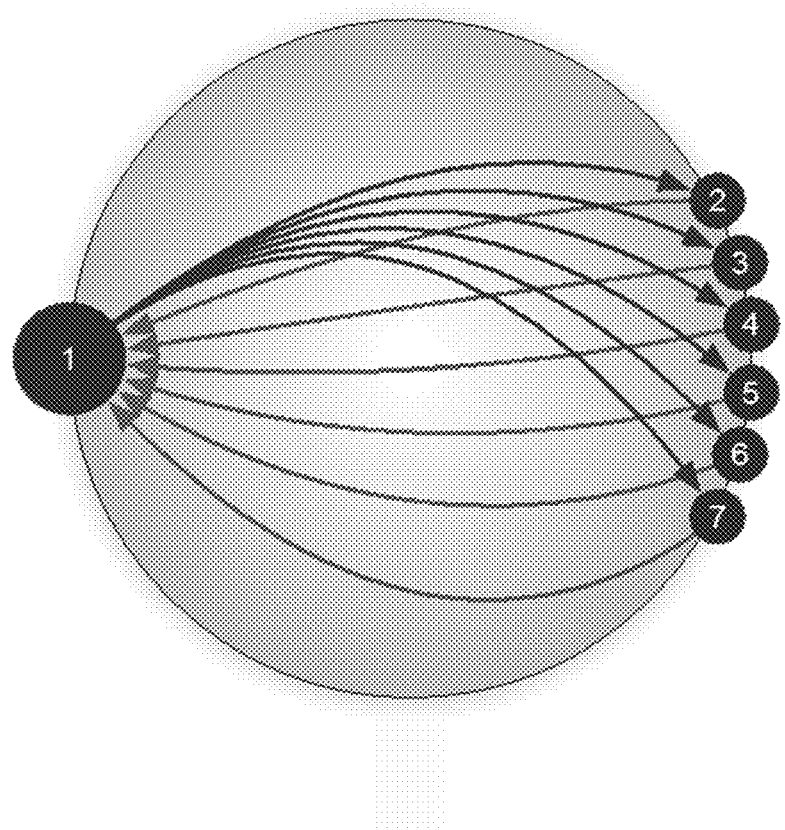
FIG. 10 is a diagram illustrating asymmetrical forwarding behavior between a plurality of endpoints.

FIG. 10 shows an example of a communication sphere with seven endpoints (labeled 1-7), a first fork that forwards data from endpoint 1 to the endpoints labeled 2-7 (with multiple output segments), and a set of six forks forwarding data in the opposite direction. The communication service for the first fork could specify a forwarding precedence (communication facet) as "dedicated" (communication facet value) to indicate that a communication path is to be reserved for exclusive use. It could also request a very low setting for forwarding latency (another communication facet). If the forwarding elements in the communication sphere are capable of supporting physical layer switching (for instance by means of an optical or electro-optical crossbar), it could result in a very low-latency forwarding topology by replicating bit patterns instead of having to look up frame headers to perform forwarding. The set of six forks indicate that their communication traffic needs to be merged towards endpoint 1 and this function cannot be performed at the physical layer, so some datalink layer switching or routing function is required in that communication path.

The configuration for the communication sphere in FIG. 10 can be applied to a single forwarding element and operate a properly equipped device to distribute traffic from endpoint 1 to the other endpoints with very low latency while the traffic in the opposite direction can use a conventional layer 2 switch that traffic from endpoints 2 through 7 towards endpoint 1. Such a device exhibits asymmetrical forwarding behavior that benefits fast distribution of traffic streams (multicast traffic being one application).

Figure 11:
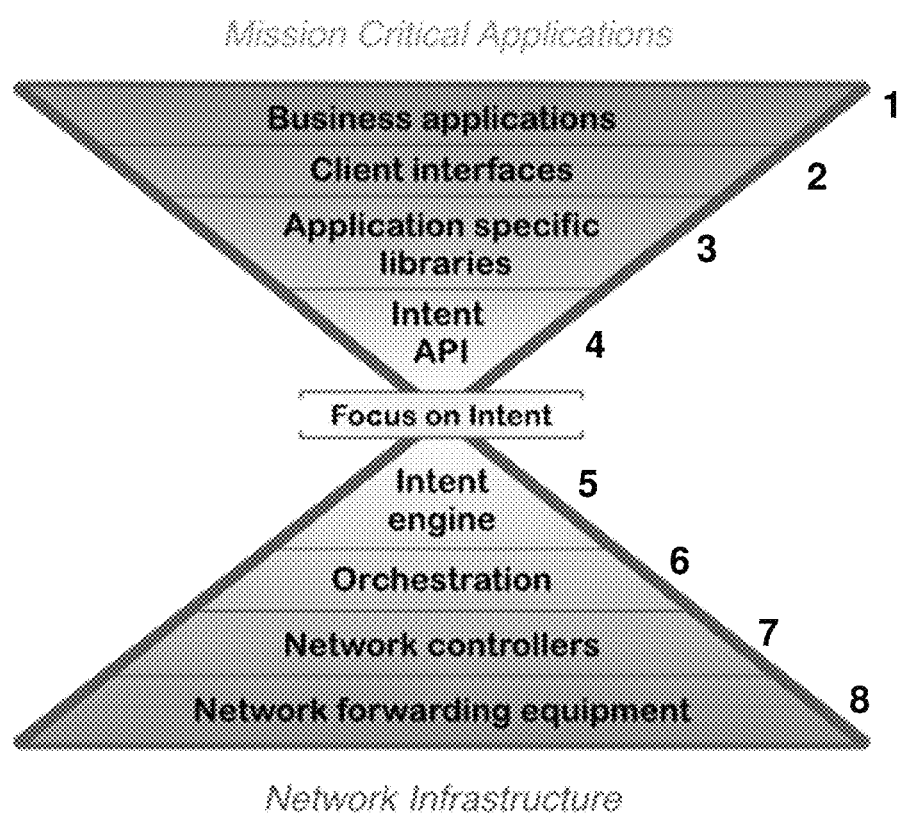
FIG. 11 is a diagram illustrating how mission critical software applications can leverage intent to interact with the network infrastructure.

FIG. 11 shows how mission critical applications (labeled 1-3) can leverage intent to interact with the network infrastructure (labeled 6-8). The waistline (labeled 4 and 5) in the center is where the two worlds meet at an intent boundary taking expressions of intent (using an Intent Application Programming Interface labeled as 4) and rendering it into instructions to the network (using an Intent Engine labeled as 5). The waistline illustrates how a narrow but universal set of intent definitions—such as communication spheres, facets and profiles can connect the otherwise broad and diverse worlds of software applications and networking equipment.

The forgoing describes how intent-driven networks can be operated to adapt to the performance needs of application workloads and thus lay the foundation for building agile networks. As the demand for network bandwidth grows faster than the capacity gains in the underlying hardware technology can accommodate, we want to rely less on static, one-size-fits-all networking like the current Internet, and rely more on dynamic networks that can differentiate among the service needs of different traffic flows. Instead of requiring human intervention to recalibrate networks when it is too late, intent-driven networks allow applications to express their performance needs—in real time—using the previously described communication spheres, facets and profiles so networks can deliver a better quality of experience to the end user. For example, real-time media flows used in videoconferencing have very stringent network delivery requirements and even automated detection methods, like deep-packet inspection, are increasingly ineffective given the ever-widening adoption of traffic encryption. In one introductory application, intent-driven can be used to determine the possible ways these media flows could be routed through the available networks. It can then compute a set of choke points where flow-based policies are applied to mark these traffic flows and thereby allow conventional forwarding equipment to identify and expedite these workloads.

Another benefit of intent-driven networks is in the optimization of computationally intensive applications such as data analytics. In current hierarchical networks, there are limited alternative routes available between clustered compute servers, but advances in hardware integration are embedding networking functions into general purpose processors, allowing servers to be directly interconnected with multiple channels to multiple neighbors. The resulting path diversity allows parallel communication which is not easily be leveraged by today's networking software. But intent-driven networks can compute how to optimize aggregate performance based on intent definitions, and can even consider how to avoid exhaustion of the limited buffering space found in today's network switches that are forced to dedicate silicon resources to increased port density.

In yet another application, virtual networks can be layered over intent-driven networks and leverage computation to avoid hotspots in the physical network that are so common yet hard to remedy with today's networking solutions.

The forgoing description, for purposes of explanation, uses specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. A method for provisioning a communication network, comprising:
    selecting, by a network infrastructure controller connected to the communication network, a software application from among a plurality of software applications, wherein:
        the selected software application is comprised of at least a first and a second microservice, each of which have associated operational requirement information maintained in a non-volatile computer readable medium comprising the communication network; and
        the communication network is comprised of a plurality of networked equipment each of which has one or more of processing elements, forwarding elements and communication channel element capabilities that are maintained in a computer readable medium comprising the communication network;
    comparing, by the network infrastructure controller, the operational requirement information associated with the first and the second microservice to capability information associated any one of the plurality of networked equipment to identify a first processing element capable of supporting the first microservice and to identify a second processing element capable of supporting the second microservice, and placing each microservice on the networked equipment identified as being able to support it;
    identifying a plurality of communication network topologies, each of the topologies is comprised of the first and second processing elements and at least one forwarding path between the processing elements that satisfies the communication requirements of both microservices, and maintaining each of the identified communication network topologies as a set of communication network topologies; and
    selecting one of the communication network topologies from the set of topologies and provisioning the processing, forwarding and communication channel elements comprising the selected topology to support the operation of both microservices.

2. The method of claim 1, wherein each of the forwarding paths is comprised of one or more networked forwarding elements and communication channel elements.

3. The method of claim 1, wherein the first and the second microservices are designed to communicate with each other during a time that the software application is operating.

4. The method of claim 1, wherein the operational requirement information associated with each microservice is maintained, for use by the network infrastructure controller, as an operational requirement model.

5. The method of claim 4, wherein each operational requirement model comprises a plurality of uniquely identified stages, and each stage is comprised of either a set of compute, memory and storage requirements, or a set of communication requirements associated with a microservice.

6. The method of claim 5, wherein first and second ones of the plurality of the stages are comprised of compute, memory and storage operational requirements, and the first and second ones of the stages are joined to each other by a third stage comprising communication requirements that together form the operational requirement model for the application that the selected network topology supports.

7. The method of claim 5, wherein each of the stages are displayed visually by a graphical user interface as two or three-dimensional geometric images.

8. The method of claim 7, wherein the stage comprising compute, memory and storage requirements is displayed visually as a cube, and the stage comprising communication requirements is displayed visually as a sphere.

9. The method of claim 8, wherein the sphere can be joined to two or more cubes.

10. The method of claim 1, wherein each of the plurality of the software applications available to the network infrastructure controller for selection have an indication of their selection priority.

11. A system for provisioning a communication network, comprising:
    the communication network comprising a plurality of networked equipment each of which has any one or more of processing, memory, storage and communication channel element capability information associated with it that is maintained in a non-volatile, computer readable medium;
    a store having a plurality of computer applications and associated operational requirement information maintained in a non-volatile, computer readable medium; and
    a network infrastructure controller connected to the communication network that operates to:
        select any one of the plurality of the software applications;
        compare the operational requirement information associated with a first and a second microservice comprising the selected software application to capability information associated any one of the plurality of networked equipment to identify a first processing element capable of supporting the first microservice and to identify a second processing element capable of supporting the second microservice;
        place each microservice on the networked equipment identified as being able to support it;

identify a plurality of communication network topologies, each of the topologies comprising the first and second processing elements and at least two forwarding paths between them that satisfy the communication requirements of both microservices, and maintaining each identified communication network topology as a set of communication network topologies; and selecting one of the communication network topologies from the set of topologies and provisioning the processing, forwarding and communication channel elements comprising the selected topology to support the operation of both microservices.

\* \* \* \* \*